US005744419A

United States Patent [19]
Choudhary et al.

[11] Patent Number: 5,744,419
[45] Date of Patent: Apr. 28, 1998

[54] PROCESS FOR THE PREPARATION OF AN IMPROVED SUPPORTED CATALYST, CONTAINING NICKEL AND COBALT, WITH OR WITHOUT NOBLE METALS, USEFUL FOR THE OXIDATIVE CONVERSION OF METHANE, NATURAL GAS AND BIOGAS TO SYNGAS

[75] Inventors: Vasant Ramchandra Choudhary; Balu Shivaji Uphade; Ajit Singh Mamman; Amarjeet Munshiram Rajput, all of Maharashtra, India

[73] Assignee: Council of Scientific And Industrial Research, New Delhi, India

[21] Appl. No.: 517,213

[22] Filed: Aug. 21, 1995

Related U.S. Application Data

[63] Continuation-in-part of Ser. No. 359,035, Dec. 19, 1994.
[51] Int. Cl.$^6$ .............................. B01J 23/40; B01J 23/72; B01J 23/58
[52] U.S. Cl. ........................ 502/326; 502/328; 502/337
[58] Field of Search ................................. 502/328, 337, 502/326

[56] References Cited

U.S. PATENT DOCUMENTS

| | | | |
|---|---|---|---|
| 4,082,696 | 4/1978 | Robinson | 252/466 |
| 4,626,521 | 12/1986 | Murib | 502/328 |
| 4,701,434 | 10/1987 | Koll | 502/230 |
| 4,992,408 | 2/1991 | Jackson | 502/328 |

*Primary Examiner*—Glenn Caldarola
*Assistant Examiner*—Tanaga A. Boyer
*Attorney, Agent, or Firm*—Michael D. Bednarek; Kilpatrick Stockton LLP

[57] ABSTRACT

A supported catalyst is prepared by depositing oxides of nickel and cobalt, with or without noble metals, on a sintered low surface area porous inert support, surface of which is precoated with an oxide of Be, Mg, Ca or a mixture thereof so that a protective layer of the alkaline earth oxide is formed between the oxides of nickel and cobalt, with or without noble metal, and the support and hence direct chemical interactions between the oxides of the group VIII transition metals and the reactive components of support, which leads to the formation of catalytically inactive binary oxide phases are avoided.

10 Claims, No Drawings

PROCESS FOR THE PREPARATION OF AN IMPROVED SUPPORTED CATALYST, CONTAINING NICKEL AND COBALT, WITH OR WITHOUT NOBLE METALS, USEFUL FOR THE OXIDATIVE CONVERSION OF METHANE, NATURAL GAS AND BIOGAS TO SYNGAS

CROSS-REFERENCES TO RELATED APPLICATIONS

This is a continuation-in-part of U.S. patent application Ser. No. 08/359,035, filed on Dec. 19, 1994 in the name of Choudhary et al.

BACKGROUND OF THE INVENTION

Field of the Invention

This invention relates to an improved supported catalyst, containing nickel and cobalt, with or without noble metals, prepared by the deposition of oxides of these transition metals on a sintered low surface area porous catalyst carrier (i.e. support) precoated with BeO, MgO, CaO or their mixture, useful for the oxidative conversion of methane, natural gas (which comprises of mainly methane with smaller amounts of ethane, propane, butane, $CO_2$ and $N_2$ and traces of $C_{5+}$ hydrocarbons and water) and biogas (which comprises of mainly methane and $CO_2$) to syngas (i.e. CO and $H_2$) involving partial oxidation with oxygen or oxidative steam and/or $CO_2$ reforming with oxygen of methane or light hydrocarbons (i.e. hydrocarbons containing 1 to 4 carbon atoms). This invention particularly relates to a process for the preparation of an improved supported catalyst, containing nickel and cobalt, with or without noble metals, useful for the oxidative conversion of methane, natural gas and biogas to syngas involving partial oxidation with oxygen or oxidative steam and/or $CO_2$ reforming with oxygen of methane or light hydrocarbons, which comprises of the deposition of oxides of nickel and cobalt, with or without noble metals, on a sintered low surface area porous catalyst carrier (i.e. support) precoated with BeO, MgO, CaO or their mixture. The catalyst prepared by this invention can be used for the production of CO and $H_2$ or syngas from methane, natural gas and biogas.

The process of the present invention could be used by catalyst manufacturers and producers of carbon monoxide, hydrogen or synthesis gas as well as their users, for examples those produce methanol and methanol based products, Fischer—Tropsch synthesis products such as liquid hydrocarbons, olefins, alcohols and aldehydes, ammonia and ammonia based fertilizers and chemicals, oxosynthesis products town gas, and reduction gas for production of sponge iron, etc.

DESCRIPTION OF THE RELATED ART

In the prior art, it is well known that syngas (i.e. CO and $H_2$) can be produced from methane (or natural gas) by following the different catalytic processes.

Steam reforming of methane: this is a highly endothermic process and involves following reactions:

Main reaction $$CH_4+H_2O \rightarrow CO+3H_2 \tag{1}$$

Side reaction $$CO+H_2O \rightarrow CO_2+H_2 \tag{2}$$

$CO_2$ reforming of methane: this is also a highly endothermic process and involves following reactions:

Main reaction $$CH_4+CO_2 \rightarrow 2CO+2H_2 \tag{3}$$

Side reaction $$CO_2+H_2 \rightarrow CO+H_2O \tag{4}$$

Partial oxidation (i.e. oxidative conversion) of methane: this is an exothermic process and involves following reactions:

Main reaction $$CH_4+0.5\ O_2 \rightarrow CO+2H_2 \tag{5}$$

Side reactions $$CH_4+2O_2 \rightarrow CO_2+2H_2O \tag{6}$$

$$CO+H_2O \rightarrow CO_2+H_2 \tag{7}$$

The use of nickel containing catalysts, particularly nickel (with or without other elements) supported on alumina or other refractory materials, in the above catalytic processes for conversion of methane (or natural gas) to syngas is also well known in the prior art (Ref. Kirk and Othmer, Encyclopedia of chemical Technology, 3rd Edn., 1990, Vol. 12 p. 951; Ullmann's Encyclopedia of Industrial Chemistry, 5th Edn., 1989, Vol. A12, p. 186 and 202; U.S. Pat. No. 2,942,958 (1960); U.S. Pat. No. 4,877,550 (1989); U.S. Pat. No. 4,888,131 (1989), EP 0 084 273 A2 (1983); EP 0 303 438 A3 (1989); Dissanayake et. al., Journal of Catalysis, Vol. 132, p. 117 (1991)).

In U.S. Pat. No. 2,942,958 (1960), use of a catalyst comprising nickel oxide supported on refractory material such as zirconia or other refractory metal oxide support has been disclosed for the conversion of a normally gaseous hydrocarbon in presence of oxygen and steam to syngas at reaction temperature between 1800° F. (i.e. 982° C.) and 2200° F. (i.e. 1204° C.).

In U.S. Pat. No. 4,877,550 (1989), Goatsch et al. have disclosed use of Ni/α-$Al_2O_3$ (0.5–2.5 wt. % Ni supported on α-$Al_2O_3$) catalyst of particle size 30–150μ in a fluid bed process for converting methane, by its reaction with oxygen and steam to syngas at reaction temperature of at least 1700° F. (i.e. 927° C.). The Ni/α-$Al_2O_3$ was prepared by impregnating nickel nitrate on alpha-alumina, drying and calcining to convert the nickel salt to nickel oxide and finally reducing in $H_2$ to get the supported nickel catalyst. The use of Ni/$Al_2O_3$ catalyst in conversion of light hydrocarbons e.g. methane by its reaction temperature of at least at 1750° F. (i.e. 954° C.) in fluidized bed reactor has also been disclosed in U.S. Pat. No. 4,888,131 (1989).

European patent EP 0 303 438 A3, describes use of a catalyst comprising of Pt, Rh, Ir, Os, Ru, Pd, Ni, Cr, Co, Ce, La, and mixture thereof supported on monolithic structure containing alumina, zirconia, mullite, etc., for production of syngas from natural gas by its reaction with steam and oxygen at a temperature in the range from 760° C. to 1090° C.

In European patent EP 0 084 273 A2, use of iron, cobalt or nickel, preferably nickel, supported on silica as a catalyst in the production of CO and $H_2$ (or syngas) from $C_2$–$C_4$ olefins and $C_1$–$C_4$ paraffins by their reaction with carbon dioxide has been disclosed. The silica supported nickel catalyst was prepared by impregnating nickel nitrate on hydrothermally treated silica, drying at 110° C., calcining in air at 150° C. for 1.5 H and further at 650° C. for 0.5 h and cooling the reduced catalyst in $N_2$ atmosphere.

Recently, Dissanayake et al. (Journal of Catalysis, Vol. 132, P. 117 (1991)) have observed that unreduced alumina supported nickel catalyst contains $NiAl_2O_4$ and shows measurable catalytic activity in oxidative conversion of methane to syngas only above 750° C. after the reduction of $NiAl_2O_4$ to metallic nickel dispersed on the alumina support.

It is well known that nickel catalysts are deactivated due to coke deposition and also by poisoning with sulfur containing compounds in the reforming of methane or $C_1$–$C_4$ hydrocarbons.

The main disadvantages of the supported nickel catalysts described in the prior art for their use in the conversion of methane and light hydrocarbons to syngas are as follows.

1) The catalysts are prepared by depositing nickel oxide, with or without other catalytically active metal oxides, directly on refractory supports viz. alumina, silica and zirconia, and calcined at high temperatures. Hence, during the calcination, the deposited metal oxide undergoes solid-solid reaction with $Al_2O_3$, $SiO_2$ and $ZrO_2$ resulting in the formation of catalytically inactive binary metal oxide phases such as nickel aluminate, nickel silicate and zirconium nickelate, respectively. These binary metal oxide phases are very difficult to reduce and catalytically inactive. Even after the reduction of the catalyst to metallic Ni, these inactive binary metal oxide phases reappear during the long operation process and also during catalyst regeneration involving the burning of the coke on the catalyst. Therefore, the catalysts have poor stability, low activity and selectivity and also show low efficiency (i.e. productivity for CO and $H_2$ in the methane- or light hydrocarbons-to-syngas conversion processes.

2) The catalysts operate at high temperatures, at least at 1700° F. (i.e. 927° C.), in the oxidative conversion of methane or natural gas-to-syngas.

3) In most of the cases, the catalysts are reduced by hydrogen before using them in the methane or light hydrocarbons-to-syngas conversion processes.

4) The catalysts when used in unreduced form show activity in the oxidative conversion of methane to syngas at high temperatures; the reaction is initiated only above 750° C.

Hence, there is a need to develop improved nickel containing supported catalyst eliminating the above limitations and disadvantages of the supported nickel containing catalysts used in the prior art for the conversion of methane or natural gas to syngas. This invention was, therefore, made with the following objects.

SUMMARY OF THE INVENTION

1) The main object of this invention is, accordingly, to provide an improved nickel containing supported catalyst, which shows improved performance (i.e. very high activity and selectivity) and efficiency (i.e. very high productivity for syngas), and which is useful in the different catalytic processes for the oxidative conversion of methane, natural gas or biogas to syngas by the oxidative conversion or partial oxidation with $O_2$ reforming.

2) Other important object of this invention is to provide an improved nickel containing supported catalyst which operates at low temperatures with high activity, selectivity and productivity in the oxidative conversion of methane to syngas.

3) Other object of this invention is to provide an improved nickel containing supported catalyst which can be used in its unreduced form (i.e. without reduction by $H_2$) also for the above-mentioned processes.

4) Yet another object of this invention is to provide an improved supported nickel containing catalyst which when used in its unreduced form shows the initiation of reaction at low temperatures, below 700° C., in the oxidative conversion of methane or natural gas to syngas.

5) One more object of this invention is to provide an improved nickel containing supported catalyst which shows high resistance towards deactivation due to coke deposition and poisoning with sulfur compounds and, also shows resistance towards the formation of inactive bimetallic oxide phases during its long operation in the process and during the regeneration of coked catalyst.

This invention provides an improved supported catalyst, containing oxides of nickel and cobalt, with or without noble metals, deposited on a precoated support, represented by the formula:

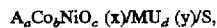

$$A_a Co_b NiO_c \; (x)/MU_d \; (y)/S,$$

wherein, A is a noble metal element selected from Ru, Rh, Pd, Pt, Lr, Us, or a mixture thereof; Co is cobalt; Ni is nickel; O is oxygen; M is an alkaline earth element selected from Be, Mg, Ca or a mixture thereof; a is an A/Ni mole ratio in the range of 0 to about 0.1; b is Co/Ni mole ratio in the range of about 0.01 to about 2.0; c is the number of oxygen atoms needed to fulfill the valence requirement of $A_a Co_b Ni$; d is the number of oxygen atoms required to fulfil the valence requirement of M; S is a catalyst support selected from sintered low surface area porous refractory inert solids comprising of alumina, silica, silica-alumina, silicon carbide, zirconia, hafnia or a mixture thereof; y is a weight percent loading of $MU_d$ precoated on the support in the range of about 0.3 wt. % to about 30 wt. % and x is the wt. %. loading of $A_a Co_b NiO_c$ deposited on the precoated support in the range of about 0.3 wt. % to about 30 wt. %, and prepared by precoating support with $MO_d$, and then depositing $A_a CO_b NiO_c$ on the precoated support, useful for the oxidative conversion of methane, natural gas and biogas to syngas (i.e. CO and $H_2$) by different processes involving partial oxidation with oxygen or oxidative steam and/or $CO_2$ reforming with oxygen of methane or light hydrocarbons to syngas.

The main features of this invention is that the precoating of catalyst support with BeO, MgO, CaO or their mixture drastically improves the performance (i.e. activity, selectivity and productivity) of a supported catalyst, containing nickel and cobalt, with or without noble metals, in the oxidative conversion of methane, natural gas and biogas to syngas. The supported catalyst prepared by depositing oxides of nickel and cobalt, with or without noble metals, on a sintered low surface area porous support precoated with the above alkaline earth oxides shows much higher activity, selectivity and productivity in the conversion of methane, natural gas and biogas to syngas than that shown by the catalyst prepared by depositing oxides of nickel and cobalt, with or without noble metals, alkaline earth oxides, directly on the support (i.e. without any precoating).

Another important feature of this invention is that the reaction start temperature (i.e. the temperature at which reaction is initiated or started when feed is passed over the catalyst and its temperature is increased gradually) in oxidative conversion of methane to syngas for the catalyst prepared using the precoated support, is much lower than that observed for a catalyst prepared using the support without any precoating.

Another important feature of this invention is that the improved catalyst prepared by the process of this invention can be used in its unreduced form (i.e. without pre-reduction by $H_2$) in the different processes for the oxidative conversion of methane or light hydrocarbons to syngas.

One more important feature of this invention is that the improved catalyst of this invention operates at much lower temperatures and at much higher space velocities and also shows high resistance to the formation of catalytically inactive binary metal oxide phases and the deactivation due to coke deposition in the methane- or light hydrocarbons-to-syngas conversion processes.

Accordingly, this invention provides a process for the preparation of an improved supported catalyst, containing oxides of nickel and cobalt, with or without noble metals, deposited on a precoated support, represented by the formula:

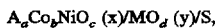

$$A_aCo_bNiO_c\ (x)/MO_d\ (y)/S,$$

wherein, A is a noble metal element selected from Ru, Rh, Pd, Pt, Ir, Os, or a mixture thereof; Co is cobalt; Ni is nickel; O is oxygen; M is an alkaline earth element selected from Be, Mg, Ca or a mixture thereof; a is an A/Ni mole ratio in the range of 0 to about 0.1; b is a Co/Ni mole ratio in the range of about 0.01 to about 2.0; c is the number of oxygen atoms needed to fulfill the valence requirement of $A_aCo_cNi$; d is the number of oxygen atoms required to fulfill the valence requirement of M, S is a catalyst support selected from sintered low surface area porous refractory inert solids comprising of alumina, silica, silica-alumina, silicon carbide, zirconia, hafnia or a mixture thereof; y is the weight percent loading of the alkaline earth oxides, $MO_d$, precoated on the support in the range of about 0.3 wt. % to about 30 wt. %; and x is the wt. % loading of the group VIII transition metal oxides, A Co Nio, deposited on the precoated support in the range of about 0.3 wt. % to about 30 wt. %, useful for the oxidative conversion of methane, natural gas and biogas to syngas by different processes involving partial oxidation with oxygen or oxidative steam and/or $CO_2$ reforming with oxygen of methane or light hydrocarbons to syngas which comprises:

(i) precoating of the surface of the support by the deposition of $MO_d$ by impregnating or coating the support with a compound represented by the general formula: $M2_h$, wherein: M is alkaline earth element selected from Be, Mg, Ca or a mixture thereof; Z is an anion selected from nitrate, acetate, formate, oxalate, hydroxide, carbonate and oxide anions; and h is number of Z required to fulfill the valence requirement of M in the compound, which on decomposition converts into oxide form, in quantity sufficient to obtain a loading of $MO_d$ on support in the range of about 0.3 wt. % to about 30 wt. %, by known methods followed by drying the wet mass by heating it in air or under vacuum first slowly at about 50° C. for about 6 h and then at about 120° C. for about 2 h, and then decomposing the dried mass by heating it in air or inert gas or under vacuum at a temperature in the range of about 400° C. to about 600° C. for a period in the range of about 0.5 h to about 5 h and finally calcining it at a temperature in the range of about 600° C. to about 1500° C. in air or inert gas or under vacuum for a period in the range of about 0.1 to about 10 h to obtain the support precoated with $MO_d$; and (ii) deposition of $A_aCo_bNiO_c$ on the surface of precoated support by impregnating or coating it with the compounds of nickel, cobalt and noble metals, represented by the general formulae: $NiY_e$, $CoY_f$ and $AX_g$, respectively, wherein: Ni is nickel; Co is cobalt; A is noble metal element selected from Ru, Rh, Pd, Pt, Ir, Os, or their mixture; Y is an anion selected from nitrate, acetate, formate, oxalate, oxide, carbonate and hydroxide anion; X is an anion selected from nitrate, acetate, chloride and $(H_2Cl_6)^{4-}$ anions; g and f are the number of Y needed to fulfill the valence requirement of Ni and Co, respectively, in their compounds; and E is the number of X needed to fulfill the valence requirement of A in its compound, which on decomposition convert into their oxide form, with A/Ni and Co/Ni mole ratios in the range of 0 to about 0.1 and about 0.01 to about 2.0, respectively, and in quantities sufficient to obtain a loading of $A_aCo_bNiO_c$ on the precoated support in the range of about 0.3 wt. % to about 30 wt. %, by the known methods followed by drying slowly the wet catalyst mass by heating it in air or under vacuum at about 50° C. for about 6 h and further at about 120° C. for about 2 h, and then decomposing the dried catalyst mass by heating it in air or inert gas or under vacuum first at a temperature in the range of about 400° C. to about 600° C. for a period in the range of about 0.5 h to about 5 h and finally calcining it in air, inert gas or under vacuum at a temperature in the range of about 600° C. to about 1000° C. for a period in the range of about 0.1 to about 10 h.

DETAILED DESCRIPTION OF THE PREFERRED EMBODIMENTS

The support used in the preparation of an improved catalyst of this invention is in the form of granules (or aggregates). The particle-size may range from about 1 mm to about 10 mm or in the form of spheres, cylindrical pellets, rings, saddles or star of diameter or size in the range of about 3 mm to about 15 mm and has surface area, pore volume and porosity in the range from about 0.002 $m^2.g^{-1}$ to about 5.0 $m^2.g^{-1}$, about 0.05 $cm^3.g^{-1}$ and about 0.5 $cm^3.g^{-1}$ and about 10% to about 70%, respectively.

The preferred noble metal, A, in the catalyst is Ru or Rh and the preferred A/Ni mole ratio, a, in the catalyst is in the range of 0 to about 0.05. The preferred Co/Ni mole ratio, b, in the catalyst is in the range of about 0.05 to about 1.0. The preferred loading of $A_aCO_bNiO_c$ on the precoated support, x, is in the range of about 5 wt. % to about 20 wt. %. The preferred element, M, in the catalyst is Mg, Ca or a mixture thereof. The preferred loading of $MO_d$ on support, y, is in the range from about 3 wt. % to about 15 wt. %. The preferred anion, Z, in the compound $MZ_h$ is nitrate anion. The preferred anion, x, in the compound $AX_a$ is chloride anion. The preferred anion, Y, in the compound $CoY_f$ and $NiY_g$, is nitrate anion. The preferred known method used for the precoating of support with the alkaline earth compounds and also for the deposition of the compounds of nickel and cobalt, with or without noble metal, is based on the impregnation of soluble compounds from their solution on the surface of porous solids. The preferred calcination temperature of the precoated support in step (i) is in the range of about 800° C. to about 1200° C. The preferred gas atmosphere for the calcination of the precoated support or the supported catalyst is air.

Because of the use of sintered low surface area inert porous support in the catalyst preparation, the chemical interactions of the catalyst components with the support are greatly reduced and also the supported catalyst has a high thermal stability, mechanical strength and attrition resistance. The surface area, porosity and texture of the support are influenced only to a small extent during the calcination and operation of the supported catalyst at high temperatures.

The precoating of the support with the alkaline earth oxides in step (i) of the catalyst preparation is very important. Because of the precoating, a layer of the alkaline earth oxide exists between the support and the catalytically active group VIII transitional metal oxides (i.e. oxides of Ni, Co and noble metals), and therefore, direct contact and consequent chemical interactions, which lead to the formation of catalytically inactive and/or difficult to reduce binary oxide phases by solid-solid reactions between the catalytically active components and the reactive components of support during the calcination and/or long operation of the supported catalyst, between the support and the group VIII transition metal oxides, are avoided or greatly reduced. Another important role of the precoating is to provide more surface for the dispersion of the catalytically active components and also to provide resistance against sintering to the catalytically active components, particularly in their reduced form, during prolonged use of the catalyst.

Because of the incorporation of cobalt in the catalyst, a synergetic effect, causing enhancement in the catalytic activity and also providing resistance to the catalyst against coke deposition, is produced due to the presence of nickel and cobalt together in the catalyst.

Noble metals are catalytically active in the conversion of methane or light hydrocarbons to syngas. Also, because of the addition of noble metal to the catalyst, the reduction of metal oxides containing nickel and cobalt in the catalyst is effected at lower temperatures and hence the reaction start temperature in the methane to syngas conversion over the catalyst in its unreduced form is decreased. It is well known that noble metal oxides are easy to reduce and there is a spillover of atomic hydrogen, which is very reactive in the reduction of metal oxides, on the reduced noble metals. Because of this, the catalyst reduction is effected at lower temperatures and consequently the oxidative methane or light hydrocarbons-to-syngas conversion reaction over unreduced catalyst can be started at lower temperatures.

The slow drying of wet mass in both the catalyst preparation steps is important because when the wet mass is dried first slowly at about 50° C. and then at higher temperature at about 120° C., the distribution of the supported components is uniform throughout the catalyst.

The product obtained from the process of this invention is an improved supported catalyst comprising of nickel and cobalt oxides, with or without noble metal oxide, deposited on a sintered low surface area porous inert support precoated with the oxides of Be, Mg, Ca or a mixture thereof, useful for the oxidative conversion of methane, natural gas and biogas to syngas (i.e. CO and $H_2$) by the different processes involving partial oxidation with oxygen, steam reforming, $CO_2$ reforming, simultaneous steam and $CO_2$ reforming, simultaneous steam reforming and partial oxidation with oxygen, simultaneous $CO_2$ reforming and partial oxidation with oxygen or simultaneous steam reforming, $CO_2$ reforming and partial oxidation with oxygen of methane or light hydrocarbons to syngas.

This invention provides an improved supported catalyst, containing nickel and cobalt, with or without noble metals, which shows very high catalytic activity with very high selectivity for CO and $H_2$ and also with very high productivity for CO and $H_2$ in the conversion of methane, natural gas and biogas to syngas by the above different processes at temperatures at or below 850° C. and at very high space velocities much above 10,000 $cm^3.g^{-1}$ catalyst $h^{-1}$ for a long period without deactivation, can be prepared by the process of this invention.

Using the improved supported catalyst, prepared by the process of this invention, for the partial oxidation of methane or light hydrocarbons to syngas in presence or absence of steam and/or $CO_2$ or for the steam and/or $CO_2$ reforming of methane or light hydrocarbons to syngas in presence or absence of oxygen, methane, natural gas and biogas can be converted at or below 850° C. to CO and $H_2$ with conversion above 90%, selectivity for CO above 90%, productivity for CO in the range of 0.2 to 20 $mol.g^{-1}$ catalyst $h^{-1}$ and with $H_2/CO$ ratio in the range from about 1 to about 5.

The present invention is described with respect to the following examples. These are provided for illustrative purposes only and are not to be construed as being limitative of the invention.

Definition of terms used in the examples

Total conversion of reactant (%)=mol % of the reactant converted to all the products. Conversion of a reactant to a particular product=mol % of the reactant converted to the particular product. Selectivity for a particular product (%)= 100×[Conversion of reactant to the product (%)] [Total conversion of reactant (%)]. Productivity for a particular product ($mol.g^{-1}.h^{-1}$)=moles of the product formed in the process per-gram of catalyst per hour. Gas hourly space velocity, GHSV=Volume of gaseous reactant mixture, measured at STP, passed over a unit weight of catalyst per hour.

All the ratios of reactants or products are mole ratios.

In the conversion of natural gas to syngas, the conversion of natural gas is expressed in terms of conversion of carbon atoms present in the natural gas.

Reaction start temperature is defined as the temperature at which methane-to-syngas conversion reaction is started or initiated on the catalyst, when a feed containing reactants are passed over the catalyst and its temperature is increased gradually at a heating rate of about 10° C. $min^{-1}$ from room temperature.

EXAMPLES 1 TO 16

In these examples, preparation of improved supported catalyst with different noble metal/Ni and Co/Ni ratios, loadings of group VIII transition metal oxides on precoated support, and alkaline earth oxides precoated on different supports with different loadings, by the process of this invention is illustrated.

The catalyst is prepared in two steps by the following general procedure.

Step I: Precoating of support with alkaline earth oxide

Precursor of alkaline earth oxide, e.g. compound of alkaline earth, which on decomposition is converted into oxide form, is deposited on catalyst support either by impregnating it with water soluble precursor compound from its aqueous solution or by coating the support with insoluble precursor compound from its fine slurry. The impregnation of soluble precursor compound on the support is done by incipient wetness method (IWM) in which a concentrated solution of the precursor compound just enough in volume to fill all the pores of the support is added to the support or by wet impregnation technique (WIT) in which a concentrated solution of the precursor compound in the excess of volume required for filling all the pores of the support is added to the support and the excess of solution is removed. The coating of insoluble precursor compound is done by making a slurry of the finely ground compound in water and mixing it with the support. After the impregnation or the coating, the wet support is dried in air or under vacuum first slowly at 50° C. for 6 h and then at 120° C. for 2 h. The dried mass is then decomposed by heating it in air, or in $N_2$ or under vacuum at a temperature in the range of 400° C. to 600° C. for a period in the range of 0.5 h to 5 h. The decomposed mass is then finally calcined in air or in $N_2$ or under vacuum at a temperature in the range of 800° C. to 1200° C. for a period in the range of 0.1 h to 10 h. In case the observed loading of alkaline earth or rare earth oxide on the support is found to be less than the desired one, the above procedure is repeated so that the desired loading can be obtained.

Step II: Deposition of group VIII transition metal oxides on the precoated support Precursor compounds of Ni, Co and noble metal with desired Co/Ni and noble metal/Ni mole ratios are deposited on the precoated support, obtained in the first step, by impregnating the precoated support with water soluble precursor compounds from their mixed aqueous solution or by coating the precoated support with water insoluble precursor compounds from their mixed fine slurry, by the methods similar to that described in Step I. After the impregnation or the coating, the wet supported catalyst mass is dried and decomposed by the procedures, similar to that described in Step I. The decomposed supported catalyst mass is then finally calcined in air or in $N_2$ or under vacuum at a temperature in the range of 600° C. to 1000° C. for a period in the range of 0.1 h to 10 h, to get the improved catalyst of this invention.

The details of the preparation of improved supported catalyst in Examples 1 to 16, not covered in the above procedure, such as the precursor compounds of alkaline earth and group VIII transition metals, method of deposition (e.g. impregnation or coating) and preparation conditions, are given in Table 1 and 2 set forth at the end of this disclosure. The properties of supports used in the preparation of improved supported catalyst in Examples 1 to 16 are given in Table 3 set forth at the end of this disclosure.

EXAMPLE 17

This example illustrates that the improved supported catalyst of this invention prepared in Examples 1 to 16 can be used in its unreduced form (i.e. as prepared), shows very high conversion with very high selectivity and productivity for CO and $H_2$, operates at low temperatures and also has low reaction start or reaction initiation temperatures, in the partial oxidation of methane with $O_2$ to syngas.

The catalytic reaction over the catalyst is carried out in a continuous flow tubular fixed bed reactor packed with the catalyst by passing over it a feed comprising of reactants at different reaction conditions. The reactor temperature was measured by a Cromel-Alumel thermocouple located in the catalyst bed. The reactor effluent gases were cooled at about 0° C. to condense the water from them, using a coiled condenser immersed in an ice water slurry, and then analyzed for CO, $CO_2$, $H_2$ and unconverted reactants by an on-line gas chromatograph. The change in the volumetric flow rate of gases due to the reaction was determined by measuring the flow rate of the feed and the product gases, after removal of water, using soap bubble flow meter.

The performance of the catalysts prepared in Examples 1–16, in their unreduced form, for the partial oxidation of methane with $O_2$ to syngas was evaluated at the following reaction conditions.

Feed composition: 64.3 mol % $CH_4$ and 35.7 mol % $O_2$
Gas hourly space velocity (GHSV): 5,00,000 $cm^3g^{-1}h^{-1}$
Pressure: 1.1 atm.
Reaction temperature: 500° C. and 700° C.

The results obtained at the two reaction temperatures are presented in Table 4 set forth at the end of this disclosure.

EXAMPLE 18

This example illustrates the use of improved supported catalyst prepared in Examples 1, 4 and 12, after reduction by $H_2$, for the partial oxidation of methane with $O_2$ to syngas. The reaction is carried out using the same reactor and by the same procedure described in Example 17 except for the fact that before carrying out the reaction the catalyst is reduced in situ by passing a mixture of 50 mol % $H_2$ and 50 mol % $N_2$ at a space velocity of about 20,000 $cm^3.g^{-1}h^{-1}$ at 500° C. for 1 h.

The performance of the catalyst prepared in Examples 1, 4 and 12, in its reduced form, for the partial oxidation of methane with $O_2$ to syngas was evaluated at the following reaction conditions:

Feed composition: 64.3 mol % $CH_4$ and 35.7 mol % $O_2$
Gas hourly space velocity (GHSV): 5,00,000 $cm^3g^{-1}h^{-1}$
Pressure: 1.1 atm.
Reaction temperature 500° C. and 700° C.

The results obtained at the two reaction temperatures are presented in Table 5 set forth at the end of this disclosure.

EXAMPLE 19

This example illustrates that when the oxides of Ni and Co with or without noble metal are deposited directly on the supports used in the preparation of improved supported catalyst in Examples 1–16, i.e. without precoating the supports with the alkaline earth oxides, the supported catalysts in their both unreduced and reduced forms show very poor performance in the partial oxidation of methane with free $O_2$ to CO and $H_2$ i.e. syngas.

The performance of the supported catalysts prepared using support without precoating with the alkaline earth oxides, in their unreduced form and also in their reduced form, for the partial oxidation of methane with $O_2$ to syngas was measured in the reactor and by the procedures described in Examples 17 and 18 at the following process conditions.

Feed composition: 64.3 mol % $CH_4$ and 35.7 mol % $O_2$
Gas hourly space velocity (GHSV): 5,00,000 or 1,00,000 $cm^3g^{-1}h^{-1}$
Pressure: 1.1 atm.
Reaction temperature: 500° C. and 900° C.

The results obtained at the two reaction temperatures are presented in Table 6 set forth at the end of this disclosure. The catalysts in Table 6 were prepared by depositing oxides of Ni and Co, with or without noble metal, directly on the supports by the incipient wetness method, followed by drying, decomposing and calcining at the conditions similar to that used in Example 1. The reduction of the catalysts was done by the same procedure described in Example 18.

EXAMPLE 20

This example illustrates the use of $Co_{0.05}NiO_{1.05}$ (12.2%)/MgO(5.6%)/SA 5202 catalyst prepared in Example 1 for the steam reforming of methane to CO and $H_2$ in the absence of $O_2$ in the feed.

The steam reforming reaction is carried out in the reactor and by the procedure described in Example 17, except that the feed comprises of only $CH_4$ and steam. The results at different reaction conditions are presented in Table 7 carried at the end of this disclosure.

EXAMPLE 21

This example illustrates the use of $Co_{0.05}NiO_{1.05}$ (9.5%)/MgO(5.7%)/SZ 5564 catalyst prepared in Example 8 for the $CO_2$ reforming of methane.

The $CO_2$ reforming reaction is carried out in the reactor by the procedure described in Example 17, except that the feed comprises only $CH_4$ and $CO_2$. The results at different reaction conditions are presented in Table 8 carried at the end of this disclosure.

EXAMPLE 22

This example illustrates the use of $Co_{0.05}NiO_{1.05}$ (9.5%) MgO(5.7%)/SZ 5564 catalyst prepared in Example 6, for the simultaneous steam reforming and $CO_2$ reforming of methane to CO and $H_2$, in the absence of $O_2$ in the feed.

The simultaneous steam reforming and $CO_2$ reforming reactions are carried out in the reactor and by the procedure described in Example 17, except that the feed comprises of $CH_4$, $CO_2$ and $H_2O$. The results at different reaction conditions are presented in Table 9 set forth at the end of this disclosure.

EXAMPLE 23

This example illustrates the use of $C_{0.05}NiO_{1.05}$ (12.2%) MgO(5.6%)/SA 5205 catalyst prepared in Example 1, for the simultaneous partial oxidation of methane with $O_2$ and steam reforming of methane to CO and $H_2$.

The simultaneous partial oxidation and steam reforming reactions are carried out in the reactor and by the procedure described in Example 17, except that the feed comprises of $CH_4$, $O_2$ and $H_2$. The results at different reaction conditions are presented in Table 10 set forth at the end of this disclosure.

EXAMPLE 24

This example illustrates the use of $Co_{0.05}NiO_{1.05}$ (9.5%)/MgO(5.7%)/SZ 5564 catalyst prepared in Example 6, for the simultaneous partial oxidation with $O_2$ and $CO_2$ reforming of methane to CO and $H_2$.

The simultaneous partial oxidation and $CO_2$ reforming reactions are carried out in the reactor and by the procedure described in Example 17, except that the feed comprises of $CH_4$, $O_2$ and $CO_2$. The results at different reaction conditions are presented in Table 11 carried at the end of this disclosure.

EXAMPLE 25

This example illustrates the use of $Co_{0.05}NiO_{1.05}$ (9.5%/MgO(5.7%)/SZ 5564 catalyst prepared in Example 6, for the simultaneous partial oxidation with $O_2$, steam reforming and $CO_2$ reforming of methane to CO and—$H_2$.

The simultaneous partial oxidation, steam reforming and $CO_2$ reforming reactions are carried out in the reactor and by the procedure described in Example 17, except that the feed comprises of $CH_4$, $O_2$, $CO_2$ and steam. The results at different reaction conditions are presented in Table 12 set forth at the end of this disclosure.

EXAMPLE 26

This example illustrates the use of $CO_{0.05}NiO_{1.05}$ (9.5%)/MgO(5.7%)/SZ 5564 catalyst prepared in Example 6, for the conversion of natural gas to syngas by its partial oxidation with $O_2$, steam reforming and $CO_2$ reforming processes and also by these processes occurring simultaneously over the catalyst.

These natural gas to syngas conversion reactions are carried out in the reactor and by the procedure described in Example 17, except that the feed comprises natural gas (NG), $O_2$, $CO_2$ and steam at different $O_2$/NG,$H_2O$/NG and $CO_2$/NG ratios. The results obtained at different process conditions are presented in Table 13 set forth at the end of this disclosure.

The main advantages or major improvements achieved by this invention over the earlier preparations of supported catalyst containing nickel, useful for the oxidative conversion of methane or light hydrocarbons to syngas are as follows:

(1) The improved supported catalyst of this invention is prepared by depositing oxides of nickel and cobalt, with or without noble metals, on a sintered low surface area porous inert support, surface of which is precoated with an oxide of Be, Mg, Ca or a mixture thereof so that a protective layer of the alkaline earth oxide is formed between the oxides of nickel and cobalt, with or without noble metal, and the support and hence direct chemical interactions between the oxides of the group VIII transition metals and the reactive components of support, which leads to the formation of catalytically inactive binary oxide phases, which are very difficult to reduce, by solid-solid reactions on support surface, are avoided and thereby the catalyst shows much higher activity, selectivity and productivity, operates at lower temperatures and higher space velocities, does not deactivate due to the formation of catalytically inactive binary metal oxide phases in its operation in a long run. The catalyst can also be used in its unreduced form and the reaction on the unreduced catalyst is initiated or started at much lower temperatures, in the oxidative methane or light hydrocarbons-to-syngas conversion processes.

(ii) In the improved supported catalyst of this invention, nickel and cobalt are present together producing synergetic effect thereby increasing resistance to coke deposition on the catalyst and also enhancing its catalytic activity and selectivity in the oxidative methane or light hydrocarbons-to-syngas conversion processes, the addition of cobalt to the catalyst also reduces the reaction start temperature for the catalyst in its unreduced form.

(iii) The reaction start temperature of the improved supported catalyst in its unreduced form is further decreased by the presence of noble metal in the catalyst at low concentrations.

(iv) Because of the use of sintered low surface area porous inert support comprising of refractory material in the catalyst preparation process of this invention, the improved supported catalyst is thermally very stable and also has high mechanical strength and attrition resistance.

TABLE 1

Details of the preparation of improved supported catalysts in Examples 1-8

|  | Example 1 | Example 2 | Example 3 | Example 4 | Example 5 | Example 6 | Example 7 | Example 8 |
|---|---|---|---|---|---|---|---|---|
| Support used | SA 5205 | SA 5552 | SA 5218 | SC 5232 | SS 5231 | SZ 5564 | SA 5552 | SA 5205 |
| Precoating of the support | | | | | | | | |
| Precursor compound used | $Mg(NO_3)_2$ | $Mg(NO_3)_2$ | $Mg(NO_3)_2$ | $Mg(NO_3)_2$ | $Mg(NO_3)_2$ | $Mg(NO_3)_2$ | $Mg(NO_3)_2$ | $CA(NO_3)_2$ |
| Method of deposition | IWM | IWM | IWM | WIT | IWM | IWM | IWM | IWM |
| Decomposition temp. (°C.) | 500° C. | 500° C. | 550° C. | 510° C. | 500° C. | 490° C. | 500° C. | 500° C. |
| Decomposition atmosphere | Air | Air | Air | $N_2$ | Air | Air | Air | Air |
| Decomposition period (h) | 4h | 4h | 5h | 4h | 4h | 4h | 4h | 4h |
| Calcination temp. (°C.) | 900° C. | 900° C. | 930° C. | 900° C. | 950° C. | 900° C. | 900° C. | 900° C. |
| Calcination atmosphere | Air | Air | Air | $N_2$ | Air | Air | Air | Air |
| Calcination period (h) | 4h | 4h | 5h | 3h | 4h | 4h | 4h | 4h |
| Loading (wt. %) | 5.6% | 7.0% | 5.0% | 8.5% | 8.0% | 5.7% | 7.0% | 9.4% |
| Deposition of group VIII transition metal oxides on precoated support | | | | | | | | |
| Precursor compound of Ni | $Ni(NO_3)_2$ | $Ni(NO_3)_2$ | $Ni(NO_3)_2$ | $Ni(NO_3)_2$ | $Ni(NO_3)_2$ | $Ni(NO_3)_2$ | $Ni(NO_3)_2$ | $Ni(NO_3)_2$ |
| Precursor compound of Co | $Co(NO_3)_2$ | $Co(NO_3)_2$ | $Co(NO_3)_2$ | $Co(NO_3)_2$ | $Co(NO_3)_2$ | $Co(NO_3)_2$ | $Co(NO_3)_2$ | $Co(NO_3)_2$ |
| Precursor compound of noble metal | — | — | — | — | — | — | — | — |
| Co/Ni mole ratio | 0.05 | 0.01 | 0.06 | 0.05 | 0.07 | 0.05 | 1.0 | 0.02 |
| Noble metal/Ni mole ratio | 0.00 | 0.00 | 0.00 | 0.00 | 0.00 | 0.00 | 0.00 | 0.00 |
| Method of deposition | IWM | IWM | IWM | IWM | IWM | IWM | IWM | IWM |
| Decomposition temp. (°C.) | 500° C. | 500° C. | 450° C. | 450° C. | 480° C. | 500° C. | 500° C. | 400° C. |
| Decomposition atmosphere | Air | Air | Air | $N_2$ | $N_2$ | Air | Air | Air |
| Decomposition period (h) | 4h | 4h | 5h | 2h | 3h | 3h | 4h | 4h |
| Calcination temp. (°C.) | 900° C. | 900° C. | 930° C. | 900° C. | 950° C. | 900° C. | 900° C. | 1000° C. |
| Calcination atmosphere | Air | Air | Air | Air | $N_2$ | Air | Air | Air |
| Calcination period (h) | 4h | 4h | 4h | 3h | 2h | 3h | 4h | 0.5h |
| Loading (wt. %) | 12.2% | 19.6% | 13.5% | 15.8% | 10.3% | 9.5% | 20.7% | 16.3% |
| Improved supported catalyst produced | A | B | C | D | E | F | G | H |

IWM = incipient wetness method
WIT = Wet impregnation technique

A = $Co_{0.05}NiO_{1.05}(12.2\%)/MgO(5.6\%)/SA\ 5205$;
B = $Co_{0.01}NiO_{1.01}(19.6\%)/MgO(7.0\%)/SA\ 5552$;
C = $Co_{0.06}NiO_{1.06}(13.5\%)/MgO(5.0\%)/SA\ 5218$;
D = $Co_{0.05}NiO_{1.05}(15.8\%)/MgO(8.5\%)/SC\ 5232$;
E = $Co_{0.07}NiO_{1.07}(10.3\%)/MgO(8.0\%)/SS\ 5231$;
F = $Co_{0.05}NiO_{1.05}(9.5\%)/MgO(5.7\%)/SZ\ 5564$;
G = $CoNiO_2(20.7\%)/MgO(7.0\%)/SA\ 5552$;
H = $Co_{0.02}NiO_{1.02}(16.3\%)/CaO(9.4\%)/SA\ 5205$.

TABLE 2

Details of the preparation of improved supported catalysts in Examples 9-16

|  | Example 9 | Example 10 | Example 11 | Example 12 | Example 13 | Example 14 | Example 15 | Example 16 |
|---|---|---|---|---|---|---|---|---|
| Support used | SA 5205 | SA 5205 | SA 5205 | SA 5205 | SA 5205 | SA 5205 | SA 5205 | SA 5205 |
| Precoating of the support | | | | | | | | |
| Precursor compound used | $Ca(NO_3)_2$ | Ca-acetate | $Mg(NO_3)_2$ | $Mg(NO_3)_2$ | $Mg(NO_3)_2$ | Mg-acetate | $Mg(NO_3)_2$ | $Mg(OH)$ |
| Method of deposition | WIT | IWM | IWM | IWM | WIT | WIT | IWM | Coatin |
| Decomposition temp. (°C.) | 500° C. | 500° C. | 500° C. | 500° C. | 500° C. | 500° C. | 500° C. | 600° C. |
| Decomposition atmosphere | Air | Air | Air | Air | Air | Air | Air | Air |
| Decomposition period (h) | 4h | 4h | 4h | 4h | 4h | 4h | 4h | 4h |
| Calcination temp. (°C.) | 900° C. | 900° C. | 900° C. | 900° C. | 900° C. | 1200° C. | 900° C. | 1000° C. |
| Calcination atmosphere | Air | Vacuum | Air | Air | Air | Air | Air | Air |
| Calcination period (h) | 4h | 3h | 4h | 4h | 4h | 4h | 4h | 10h |
| Loading (wt. %) | 15.3% | 10.6% | 5.6% | 5.6% | 5.0% | 2.1% | 5.0% | 4.0% |
| Deposition of group VIII transition metal oxides on precoated support | | | | | | | | |
| Precursor compound of Ni | $Ni(NO_3)_2$ | $Ni(NO_3)_2$ | $Ni(NO_3)_2$ | $Ni(NO_3)_2$ | $Ni(NO_3)_2$ | $Ni(NO_3)_2$ | $Ni(NO_3)_2$ | $Ni(OH)$ |
| Precursor compound of Co | $Co(NO_3)_2$ | $Co(NO_3)_2$ | $Co(NO_3)_2$ | $Co(NO_3)_2$ | $Co(NO_3)_2$ | $Co(NO_3)_2$ | $Co(NO_3)_2$ | $Co(OH)$ |
| Precursor compound of noble metal | — | — | $RuCl_3$ | $H_2PtCl_6$ | — | — | — | — |
| Co/Ni mole ratio | 0.05 | 0.05 | 0.05 | 0.05 | 0.05 | 0.05 | 0.05 | 0.05 |
| Noble metal/Ni mole ratio | 0.00 | 0.00 | 0.05 | 0.05 | 0.00 | 0.00 | 0.00 | 0.00 |
| Method of deposition | IWM | IWM | IWM | IWM | IWM | WIT | IWM | Coatin |
| Decomposition temp. (°C.) | 500° C. | 500° C. | 500° C. | 500° C. | 500° C. | 500° C. | 500° C. | 500° C. |
| Decomposition atmosphere | Air | Air | Air | Air | Air | Air | Air | Air |
| Decomposition period (h) | 4h | 4h | 4h | 4h | 4h | 4h | 2h | 3h |
| Calcination temp. (°C.) | 900° C. | 900° C. | 900° C. | 900° C. | 900° C. | 1000° C. | 600° C. | 900° C. |
| Calcination atmosphere | Air | Vacuum | Air | Air | Air | $N_2$ | Air | Air |

TABLE 2-continued

Details of the preparation of improved supported catalysts in Examples 9-16

|  | Example 9 | Example 10 | Example 11 | Example 12 | Example 13 | Example 14 | Example 15 | Example 16 |
|---|---|---|---|---|---|---|---|---|
| Calcination period (h) | 4h | 4h | 4h | 4h | 4h | 4h | 4h | 10h |
| Loading (wt. %) | 17.4% | 13.1% | 13.2% | 14.7% | 1.6% | 15.5% | 10.5% | 11.0% |
| Improved supported catalyst produced | I | J | K | L | M | N | O | P |

IWM = incipient wetness method
WIT = Wet impregnation technique
I = $Co_{0.05}NiO_{1.05}(17.4\%)/CaO(15.3\%)/SA\ 5205$
J = $Co_{0.05}NiO_{1.05}(13.1\%)/CaO(10.6\%)/SA\ 5205$;
K = $Ru_{0.05}Co_{0.05}NiO_{1.13}(13.2\%)/MgO(5.6\%)/SA\ 5205$;
L = $Pt_{0.05}Co_{0.05}NiO_{1.15}(14.7\%)/MgO(5.6\%)/SA\ 5205$;
M = $Co_{0.05}NiO_{1.05}(1.6\%)/MgO(5.0\%)/SA\ 5205$;
N = $Co_{0.05}NiO_{1.05}(15.5\%)/MgO(2.1\%)/SA\ 5205$;
O = $Co_{0.05}NiO_{1.05}(10.5\%)/MgO(5.0\%)/SA\ 5205$;
P = $Co_{0.05}NiO_{1.05}(11.0\%)/MgO(4.0\%)/SA\ 5205$.

TABLE 3

Properties of the different sintered low surface area porous supports used in the preparation of improved supported catalysts in Examples 1-16; these supports are obtained from Norton Co., USA.

| Support | Shape | Composition | Surface area ($m^2 \cdot gm^{-1}$) | Pore volume ($cm^3 \cdot g^{-1}$) | Porosity (%) |
|---|---|---|---|---|---|
| SA 5205 | spherical | $Al_2O_3(86.1\%)$, $SiO_2(11.8\%)$, $K_2O(0.6\%)$ $CaO(0.4\%)$, $MgO(0.4\%)$, $Na_2O(0.4\%)$, $Fe_2O_3(0.2\%)$, $ZrO_2 + HfO_2(<0.05\%)$ | <0.05 | 0.35 | 54 |
| SA 5218 | spherical | $Al_2O_3(86.1\%)$, $SiO_2(12.0\%)$, $CaO(0.6\%)$ $MgO(0.4\%)$, $K_2O(0.4\%)$, $TiO_2(0.2\%)$, $Na_2O(0.2\%)$, $Fe_2O_3(0.1\%)$, $ZrO_2(<0.05\%)$ | <0.05 | 0.25 | 40 |
| SA 5552 | rings | $Al_2O_3(93.1\%)$, $SiO_2(5.6\%)$, $Fe_2O_3(0.3\%)$ $MgO(0.3\%)$, $TiO_2(0.1\%)$, $CaO(0.1\%)$, $Na_2O(0.1\%)$, $K_2O(0.1\%)$, $HfO_2 + ZrO_2(<0.05\%)$ | <1.00 | 0.39 | 59 |
| SC 5532 | rings | $SiC(65.8\%)$, $SiO_2(28.5\%)$, $Al_2O_3(4.7\%)$, $Fe_2O_3(0.3\%)$, $CaO(0.2\%)$, $MgO(0.1\%)$, $Na_2O(0.1\%)$, $K_2O(0.1\%)$, $ZrO_2 + HfO_2(<0.05\%)$, $TiO_2(<0.01\%)$, leachable iron = 17 pmm | <0.1 | 0.30 | 45 |
| SC 5232 | spherical | ------ do ------ | <0.3 | 0.26 | 43 |
| SS 5231 | spherical | $SiO_2(95.0\%)$, $Al_2O_3(4.1\%)$, $Fe_2O_3(0.3\%)$, $TiO_2(0.2\%)$, $CaO(0.1\%)$, $MgO(0.1\%)$, $Na_2O(0.1\%)$, $K_2O(0.1\%)$, $ZrO_2 + HfO_2(<0.05\%)$ | <0.4 | 0.25 | 35 |
| SZ 5564 | rings | $ZrO_2 + HfO_2(94.1\%)$, $CaO(3.5\%)$, $SiO_2(1.6\%)$, $Al_2O_3(0.4\%)$, $Fe_2O_3(0.2\%)$, $TiO_2(0.2\%)$, $MgO(<0.02\%)$, $Na_2O(<0.02\%)$, $K_2O(<0.02\%)$ | <0.5 | 0.15 | 45 |

TABLE 4

Results of the partial oxidation of methane with $O_2$ to CO and $H_2$ over the improved supported catalyst prepared in Examples 1-16, in its unreduced form.

| Catalyst | Reaction start temp. (°C.) | Reaction temp. (°C.) | $CH_4$ conversion (%) | Selectivity (%) | | | Productivity of CO (mol $g^{-1}h^{-1}$) | $H_2/CO$ product ratio |
|---|---|---|---|---|---|---|---|---|
|  |  |  |  | CO | $CO_2$ | $H_2$ |  |  |
| $Co_{0.05}NiO_{1.05}(12.2\%)/MgO(5.6\%)/SA\ 5205$ | 630 | 700 | 95.3 | 95.6 | 4.4 | 98.0 | 13.07 | 2.06 |
|  |  | 500 | 81.0 | 89.7 | 10.3 | 88.4 | 10.49 | 1.97 |
| $Co_{0.01}NiO_{1.01}(19.6\%)/MgO(7.0\%)/SA\ 5552$ | 600 | 700 | 78.8 | 97.8 | 2.2 | 96.8 | 11.13 | 1.98 |
|  |  | 500 | 62.7 | 86.9 | 13.1 | 90.3 | 7.88 | 2.08 |
| $Co_{0.06}NiO_{1.06}(13.5\%)/MgO(5.0\%)/SA\ 5218$ | 620 | 700 | 92.0 | 94.4 | 5.6 | 92.6 | 12.54 | 1.96 |
|  |  | 500 | 83.6 | 88.1 | 11.9 | 90.6 | 10.64 | 2.06 |
| $Co_{0.05}NiO_{1.05}(15.8\%)/MgO(8.5\%)/SC\ 5232$ | 620 | 700 | 84.6 | 95.3 | 4.7 | 92.6 | 11.64 | 1.94 |
|  |  | 500 | 72.1 | 86.3 | 13.7 | 88.6 | 8.94 | 2.05 |
| $Co_{0.07}NiO_{1.07}(10.3\%)/MgO(8.0\%)/SS\ 5231$ | 750 | 700 | 88.2 | 94.0 | 6.0 | 92.8 | 11.97 | 1.97 |
|  |  | 500 | 81.6 | 88.4 | 11.6 | 88.3 | 10.42 | 2.00 |
| $Co_{0.05}NiO_{1.05}(9.5\%)MgO(5.7\%)/SZ\ 5564$ | 630 | 700 | 90.8 | 96.3 | 3.7 | 95.9 | 12.63 | 1.99 |
|  |  | 500 | 86.6 | 91.4 | 8.6 | 93.4 | 11.43 | 2.04 |

TABLE 4-continued

Results of the partial oxidation of methane with $O_2$ to CO and $H_2$ over the improved supported catalyst prepared in Examples 1–16, in its unreduced form.

| Catalyst | Reaction start temp. (°C.) | Reaction temp. (°C.) | $CH_4$ conversion (%) | Selectivity (%) CO | $CO_2$ | $H_2$ | Productivity of CO (mol g$^{-1}$h$^{-1}$) | $H_2$/CO product ratio |
|---|---|---|---|---|---|---|---|---|
| $CoNiO_2$(20.7%)/MgO(7.0%)/SA 5552 | 630 | 700 | 90.8 | 94.4 | 5.6 | 94.4 | 12.38 | 2.00 |
|  |  | 500 | 78.0 | 87.5 | 12.5 | 90.1 | 9.86 | 2.06 |
| $Co_{0.02}NiO_{1.02}$(16.3%)/CaO(9.4%)/SA 5205 | 675 | 700 | 73.4 | 87.2 | 12.8 | 85.8 | 9.24 | 1.97 |
|  |  | 500 | 59.1 | 78.2 | 21.8 | 67.5 | 6.67 | 1.73 |
| $Co_{0.05}NiO_{1.05}$(17.4%)/CaO(15.3%)SA 5205 | 510 | 700 | 80.6 | 90.2 | 9.8 | 88.1 | 10.50 | 1.95 |
|  |  | 500 | 75.2 | 86.1 | 13.9 | 89.1 | 9.35 | 2.07 |
| $Co_{0.05}NiO_{1.05}$(13.1%)/CaO(10.6%)/SA 5205 | 540 | 700 | 81.7 | 93.3 | 6.7 | 91.9 | 11.01 | 1.97 |
|  |  | 500 | 69.9 | 85.8 | 14.2 | 86.5 | 8.66 | 2.02 |
| $Ru_{0.05}Co_{0.05}NiO_{1.13}$(13.2%)/MgO(5.6%)/SA5206 | 645 | 700 | 92.2 | 93.4 | 6.6 | 95.4 | 12.44 | 2.04 |
|  |  | 500 | 77.6 | 86.9 | 13.1 | 90.2 | 9.34 | 2.08 |
| $Pt_{0.05}Co_{0.05}NiO_{1.15}$(14.7%)/MgO(5.6%)/SA5205 | 590 | 700 | 83.6 | 94.4 | 5.6 | 91.7 | 11.40 | 1.94 |
|  |  | 500 | 72.2 | 87.6 | 12.4 | 85.9 | 9.13 | 1.96 |
| $Co_{0.05}NiO_{1.05}$(1.6%)/MgO(5.0%)/SA 5505 | 760 | 700 | 75.7 | 89.6 | 10.4 | 84.0 | 9.74 | 1.95 |
|  |  | 500 | 65.2 | 82.2 | 17.8 | 80.1 | 7.70 | 1.95 |
| $Co_{0.05}NiO_{1.05}$(15.5%)/MgO(2.1%)/SA 5205 | 670 | 700 | 80.8 | 91.6 | 8.4 | 90.8 | 10.63 | 1.98 |
|  |  | 500 | 67.0 | 83.0 | 7.0 | 84.6 | 7.99 | 2.04 |
| $Co_{0.05}NiO_{1.05}$(10.5%)/MgO(5.0%)/SA 5205 | 500 | 600 | 85.0 | 92.0 | 8.0 | 94.6 | 11.24 | 2.06 |
|  |  | 500 | 80.4 | 88.8 | 11.2 | 90.9 | 10.26 | 2.05 |
| $Co_{0.05}NiO_{1.05}$(11.0%)/MgO(4.0%)/SA 5205 | 630 | 700 | 81.9 | 90.3 | 9.7 | 90.5 | 10.61 | 2.00 |
|  |  | 500 | 71.2 | 84.2 | 15.8 | 83.9 | 8.60 | 2.00 |

TABLE 5

Results of the partial oxidation of methane with $O_2$ to CO and $H_2$ over the improved supported catalyst prepared in Examples 1, 4 and 12, in its reduced form.

| Catalyst | Reaction start temp. (°C.) | Reaction temp. (°C.) | $CH_4$ conversion (%) | Selectivity (%) CO | $CO_2$ | $H_2$ | Productivity of CO (mol g$^{-1}$h$^{-1}$) | $H_2$/CO product ratio |
|---|---|---|---|---|---|---|---|---|
| $Co_{0.05}NiO_{1.05}$(12.2%)/MgO(5.6%)/SA 5205 | 610 | 700 | 93.4 | 93.5 | 6.5 | 91.2 | 12.61 | 1.95 |
|  |  | 500 | 82.8 | 89.3 | 10.7 | 87.4 | 10.68 | 1.96 |
| $Co_{0.05}NiO_{1.05}$(15.8%)/MgO(8.5%)/SC 5232 | 590 | 700 | 90.5 | 95.2 | 4.8 | 95.3 | 12.44 | 2.00 |
|  |  | 500 | 79.3 | 88.9 | 11.1 | 89.1 | 10.18 | 2.00 |
| $Pt_{0.05}Co_{0.05}NiO_{1.15}$(14.7%)/MgO(5.6%)/SA5205 | 550 | 700 | 86.3 | 94.8 | 5.2 | 94.2 | 11.82 | 1.99 |
|  |  | 500 | 80.3 | 88.8 | 11.2 | 90.4 | 10.30 | 2.04 |

TABLE 6

Results of the partial oxidation of methane with $O_2$ to CO and $H_2$ over the supported catalysts prepared using support without precoating with alkaline earth oxide, in their unreduced and reduced forms.

| Catalyst | GHSV (cm$^3$ g$^{-1}$ h$^{-1}$) | Reduction start temp. (°C.) | Reaction temp. (°C.) | $CH_4$ conversion (%) | Selectivity (%) CO | $CO_2$ | $H_2$ | Productivity of CO (mol g$^{-1}$h$^{-1}$) | $H_2$/CO product ratio |
|---|---|---|---|---|---|---|---|---|---|
| A. Unreduced catalysts |  |  |  |  |  |  |  |  |  |
| $Co_{0.05}NiO_{1.05}$(13.3%)/SA 5205 | 5,00,000 | 780 | 800 | 3.0 | 11.1 | 88.9 | — | 0.05 | — |
|  |  |  | 700 | No reaction observed |  |  |  |  |  |
| $Co_{0.05}NiO_{1.05}$(21.0%)/SA 5552 | 5,00,000 | 850 | 900 | 3.1 | — | — | — | — | — |
|  |  |  | 700 | No reaction observed |  |  |  |  |  |
| $Co_{0.05}NiO_{1.05}$(11.4%)/SC 5532 | 5,00,000 | 850 | 900 | 1.3 | — | — | — | — | — |
|  |  |  | 700 | No reaction observed |  |  |  |  |  |
| $Co_{0.05}NiO_{1.05}$(14.4%)/SS 5231 | 5,00,000 | 750 | 800 | 5.9 | 39.1 | 60.9 | 43.4 | 0.33 | 2.23 |
|  |  |  | 700 | 4.5 | 37.6 | 62.4 | 31.3 | 0.24 | 1.66 |
| $Co_{0.05}NiO_{1.05}$(11.2%)/SZ 5564 | 5,00,000 | 760 | 800 | 55.8 | 87.5 | 12.5 | 64.3 | 7.01 | 1.50 |
|  |  |  | 700 | 51.3 | 85.3 | 14.7 | 61.4 | 6.29 | 1.44 |
| $Pt_{0.03}Co_{0.05}NiO_{1.11}$(14.5%)/SA 5205 | 5,00,000 | 600 | 800 | 24.2 | 23.9 | 76.1 | 13.9 | 0.83 | 1.16 |
|  |  |  | 700 | 21.6 | 20.4 | 79.6 | 34.3 | 0.63 | 3.36 |

TABLE 6-continued

Results of the partial oxidation of methane with $O_2$ to CO and $H_2$ over the supported catalysts prepared using support without precoating with alkaline earth oxide, in their unreduced and reduced forms.

| Catalyst | GHSV (cm³ g⁻¹ h⁻¹) | Reduction start temp. (°C.) | Reaction temp. (°C.) | CH₄ conversion (%) | Selectivity (%) CO | CO₂ | H₂ | Productivity of CO (mol g⁻¹h⁻¹) | H₂/CO product ratio |
|---|---|---|---|---|---|---|---|---|---|
| B. Reduced catalysts [catalysts reduced before reaction by H₂ at 500° C. for 1h.] | | | | | | | | | |
| Co₀.₀₅NiO₁.₀₅(21.0%)/SA 5552 | 1,00,000 | 690 | 700 | 50.1 | 64.7 | 35.3 | 60.7 | 4.66 | 1.88 |
| | | | 600 | 2.4 | 5.0 | 95.0 | 30.2 | 0.02 | 12.10 |
| | | | 500 | No reaction observed | | | | | |
| Co₀.₀₅NiO₁.₀₅(11.4%)/SC 5532 | 5,00,000 | 600 | 700 | 48.1 | 70.6 | 29.4 | 72.2 | 4.88 | 2.05 |
| | | | 600 | 31.2 | 61.3 | 38.7 | 65.3 | 2.73 | 2.13 |
| | | | 500 | No reaction observed | | | | | |

TABLE 7

Results of steam reforming of methane to CO and $H_2$ over $Co_{0.5}NiO_{1.05}(12.2\%)/MgO(5.6\%)/SA$ 5205 catalyst prepared in Example 1, in the absence of $O_2$ in feed.

| Reaction temp. (°C.) | GHSV (cm³ g⁻¹ h⁻¹) | Steam/CH₄ ratio | CH₄ conversion (%) | Selectivity (%) CO | CO₂ | H₂/CO product ratio | Productivity of CO (mol g⁻¹ h⁻¹) |
|---|---|---|---|---|---|---|---|
| 800 | 12,400 | 3.9 | 100 | 59.1 | 40.9 | 5.6 | 0.07 |
| 850 | 12,400 | 3.9 | 100 | 60.1 | 39.9 | 5.2 | 0.07 |
| 900 | 12,400 | 3.9 | 100 | 63.7 | 36.3 | 5.1 | 0.07 |
| 850 | 9,300 | 2.0 | 100 | 91.0 | 9.0 | 3.7 | 0.13 |
| 900 | 9,300 | 2.0 | 100 | 92.5 | 7.5 | 3.8 | 0.13 |
| 850 | 10,300 | 1.5 | 99.1 | 95.1 | 4.9 | 3.4 | 0.17 |
| 900 | 10,300 | 1.5 | 100.0 | 95.5 | 4.5 | 3.5 | 0.18 |
| 800 | 12,400 | 1.0 | 94.0 | 98.1 | 1.9 | 3.1 | 0.26 |
| 850 | 12,400 | 1.0 | 94.7 | 100.0 | 0.0 | 3.0 | 0.26 |
| 900 | 12,400 | 1.0 | 96.9 | 100.0 | 0.0 | 3.0 | 0.27 |

TABLE 8

Results of $CO_2$ reforming of methane to CO and $H_2$ over $Co_{0.05}NiO_{1.05}(9.5\%)/Mgo(5.7\%)/SZ$ 5564 catalyst prepared in Example 6, in the absence of $O_2$ in feed.

| Reaction temp. (°C.) | GHSV (cm³ g⁻¹ h⁻¹) | CH₄/CO₂ ratio | Conversion to CO (%) of CH₄ | CO₂ | H₂/CO product ratio | Productivity of CO (mol g⁻¹ h⁻¹) |
|---|---|---|---|---|---|---|
| 800 | 13,800 | 1.02 | 94.2 | 100 | 1.00 | 0.60 |
| 850 | 14,100 | 1.01 | 96.5 | 100 | 1.00 | 0.62 |
| 850 | 11,400 | 0.68 | 100.0 | 77.4 | 0.86 | 0.44 |

TABLE 9

Results of the simultaneous steam and $CO_2$ reforming of methane to CO and $H_2$ over $CO_{0.05}NiO_{1.05}(9.5\%)/MgO(5.7\%)/Sz$ 5564 catalyst prepared in Example 6, in the absence of $O_2$ in feed.

| Reaction temp. (°C.) | GHSV (cm³ g⁻¹ h⁻¹) | CH₄/CO₂ ratio | CH₄/H₂O ratio | Conversion to CO (%) of CH₄ | H₂O | CO₂ | H₂/CO product ratio | Productivity of CO (mol g⁻¹ h⁻¹) |
|---|---|---|---|---|---|---|---|---|
| 850 | 13,600 | 2.00 | 2.30 | 94.5 | 100 | 100 | 1.59 | 0.46 |
| 850 | 17,800 | 1.01 | 2.43 | 100 | 46.8 | 85.0 | 1.18 | 0.62 |
| 850 | 16,000 | 0.67 | 0.89 | 100 | 11.8 | 72.0 | 1.02 | 0.44 |

TABLE 10

Results of the simultaneous partial oxidation with $O_2$ and steam reforming of methane to CO and $H_2$ over $Co_{0.05}NiO_{1.05}$(12.2%)/MgO(5.6%)/SA 5205 catalyst prepared in Example 1.

| Reaction temp. (°C.) | GHSV (cm³ g⁻¹ h⁻¹) | Feed ratios $O_2/CH_4$ | Feed ratios $H_2O/CH_4$ | $CH_4$ conversion (%) | CO selectivity (%) | $H_2/CO$ product ratio | Productivity of CO (mol g⁻¹ h⁻¹) |
|---|---|---|---|---|---|---|---|
| 800 | 12,100 | 0.26 | 0.67 | 98.0 | 95.7 | 2.60 | 0.26 |
| 700 | 12,000 | 0.26 | 0.68 | 91.2 | 86.8 | 2.84 | 0.22 |
| 800 | 12,700 | 0.35 | 0.66 | 99.2 | 90.0 | 2.69 | 0.25 |
| 800 | 13,800 | 0.52 | 0.66 | 99.5 | 80.6 | 2.73 | 0.23 |
| 800 | 10,900 | 0.26 | 0.49 | 92.9 | 96.5 | 2.58 | 0.25 |
| 800 | 12,000 | 0.26 | 0.67 | 96.7 | 92.8 | 2.77 | 0.25 |
| 800 | 11,500 | 0.17 | 0.67 | 94.0 | 96.4 | 2.69 | 0.25 |
| 800 | 13,600 | 0.17 | 1.00 | 98.5 | 88.2 | 3.06 | 0.24 |
| 800 | 13,050 | 0.09 | 1.00 | 97.8 | 90.9 | 3.03 | 0.25 |
| 800 | 12,750 | 0.04 | 1.00 | 96.5 | 93.1 | 3.07 | 0.25 |
| 900 | 13,700 | 0.18 | 1.00 | 100 | 89.1 | 2.92 | 0.25 |

TABLE 11

Results of the simultaneous partial oxidation with $O_2$ and $CO_2$ reforming of methane to CO and $H_2$ over $Co_{0.05}NiO_{1.05}$(9.5%)/MgO(5.7%)/SZ 5564 catalyst prepared in Example 6.

| Reaction temp. (°C.) | GHSV (cm³ g⁻¹ h⁻¹) | Feed ratios $CH_4/O_2$ | Feed ratios $CH_4/CO_2$ | Conversion (%) $CH_4$ | Conversion (%) $CO_2$ | Conversion (%) $O_2$ | $H_2/CO$ product ratio | Productivity of CO (mol g⁻¹ h⁻¹) |
|---|---|---|---|---|---|---|---|---|
| 800 | 12,500 | 4.0 | 2.0 | 90.4 | 93.7 | 100 | 1.31 | 0.44 |
| 800 | 11,700 | 3.0 | 3.0 | 96.4 | 90.2 | 100 | 1.50 | 0.40 |
| 800 | 11,500 | 2.4 | 4.0 | 97.2 | 80.3 | 100 | 1.61 | 0.36 |

TABLE 12

Results of the simultaneous partial oxidation with $O_2$, steam reforming and $CO_2$ reforming of methane to CO and $H_2$ over $Co_{0.05}NiO_{1.05}$(9.5%)/MgO(5.7%)/SZ 5564 catalyst prepared in Example 6.

| Reaction temp. (°C.) | GHSV (cm³ g⁻¹ h⁻¹) | Feed ratios $CH_4/O_2$ | Feed ratios $CH_4/CO_2$ | Feed ratios $CH_4/H_2O$ | Conversion (%) $CH_4$ | Conversion (%) $CO_2$ | Conversion (%) $H_2O$ | Conversion (%) $O_2$ | $H_2/CO$ product ratio | Productivity of CO (mol g⁻¹ h⁻¹) |
|---|---|---|---|---|---|---|---|---|---|---|
| 800 | 12,350 | 3.0 | 4.0 | 4.8 | 99.2 | 77.6 | 48.7 | 100 | 1.68 | 0.37 |
| 800 | 13,400 | 4.0 | 4.0 | 2.25 | 99.3 | 84.4 | 82.0 | 100 | 1.95 | 0.37 |
| 845 | 13,400 | 4.0 | 4.0 | 2.25 | 100 | 77.8 | 68.0 | 100 | 1.93 | 0.37 |
| 850 | 12,250 | 2.4 | 6.1 | 4.8 | 99.6 | 72.7 | 52.1 | 100 | 1.89 | 0.34 |
| 800 | 12,250 | 2.4 | 6.1 | 4.8 | 99.0 | 57.7 | 65.7 | 100 | 1.92 | 0.33 |

TABLE 13

Results of the conversion of natural gas (NG) to syngas over $Co_{0.05}NiO_{1.05}$(9.5%)/MgO(5.7%)/SZ 5564 catalyst prepared in Example 6, at different $O_2$/NG, $CO_2$/NG and $H_2O$/NG ratios in feed.

| Reaction temp. (°C.) | GHSV (cm³ g⁻¹ h⁻¹) | Feed ratios $O_2$/NG | Feed ratios $CO_2$/NG | Feed ratios $H_2O$/NG | Conversion of C in feed to CO (%) | $H_2/CO$ product ratio | Productivity of CO (mol g⁻¹ h⁻¹) |
|---|---|---|---|---|---|---|---|
| 800 | 21,100 | 0.52 | 0.00 | 0.00 | 80.3 | 1.95 | 0.55 |
| 800 | 26,100 | 0.45 | 0.33 | 0.00 | 90.9 | 1.51 | 0.87 |
| 800 | 24,500 | 0.45 | 0.00 | 0.29 | 90.7 | 2.26 | 0.64 |
| 800 | 29,500 | 0.41 | 0.33 | 0.28 | 89.0 | 1.74 | 0.84 |

TABLE 13-continued

Results of the conversion of natural gas (NG) to syngas over
Co$_{0.05}$NiO$_{1.05}$(9.5%)/MgO(5.7%)/SZ 5564 catalyst prepared in
Example 6, at different O$_2$/NG, CO$_2$/NG and H$_2$O/NG ratios in feed.

| Reaction temp. (°C.) | GHSV (cm$^3$ g$^{-1}$ h$^{-1}$) | Feed ratios | | | Conversion of C in feed to CO (%) | H$_2$/CO product ratio | Productivity of CO (mol g$^{-1}$ h$^{-1}$) |
|---|---|---|---|---|---|---|---|
| | | O$_2$/NG | CO$_2$/NG | H$_2$O/NG | | | |
| 800 | 31,600 | 0.24 | 0.49 | 0.42 | 91.4 | 1.69 | 0.97 |
| 800 | 29,700 | 0.00 | 0.98 | 0.00 | 85.8 | 1.00 | 1.21 |
| 850 | 30,900 | 0.00 | 0.98 | 0.00 | 91.5 | 1.00 | 1.34 |
| 800 | 12,200 | 0.00 | 0.00 | 1.10 | 95.8 | 3.20 | 0.25 |

Natural gas composition (mol %):
CH$_4$: 88.9%, C$_2$H$_6$: 6.3%, C$_3$H$_8$: 2.3%, C$_4$H$_{10}$: 0.9%, CO$_2$: 1.1%, N$_2$: 0.5%.

We claim:

1. A process for the preparation of a supported catalyst, containing oxides of nickel and cobalt, deposited on a precoated support, represented by the formula:

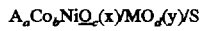

$$A_aCo_bNiO_c(x)/MO_d(y)/S$$

wherein: A is a noble metal element selected from the group consisting of Ru, Rh, Pd, Pt, Ir, Os, or a mixture thereof, Co is cobalt; Ni is nickel; O is oxygen; M is an alkaline earth element selected from the group consisting of Be, Mg, or a mixture thereof, a is an A/Ni mole ratio in the range of 0 to about 0.1; b is a Co/Ni mole ratio in the range of about 0.01 to about 2.0; c is a number of oxygen atoms needed to fulfill the valence requirement of A$_a$Co$_b$Ni; d is a number of oxygen atoms required to fulfill the valence requirement of M; S is a catalyst support comprising sintered, porous refractory inert solids comprising alumina, silica, silica-alumina, silicon carbide, zirconia, hafnia or a mixture thereof and having a surface area in the range of about 0.002 m$^2$g$^{-1}$ to about 5.0 m$^2$g$^{-1}$; y is a weight percent loading of the alkaline earth oxides, MO$_d$, precoated on the support in the range of about 0.3 wt. % to about 30 wt. %; and x is a wt. % loading of the group VIII transition metal oxides, A$_a$Co$_b$NiO$_c$, deposited on the precoated support in the range of about 0.3 wt. % to about 30 wt. %, useful for the oxidative conversion of methane, natural gas and biogas to syngas by processes involving partial oxidation with oxygen or oxidative steam and/or CO$_2$ reforming with oxygen of methane or light hydrocarbons to syngas, which comprises:

(1) precoating the surface of the support by the deposition of MO$_d$ by impregnating or coating the support with a compound represented by the formula: MZ$_h$, wherein: M is alkaline earth element selected from the group consisting of Be, Mg, or a mixture thereof; Z is an anion selected from the group consisting of nitrate, acetate, formate, oxalate, hydroxide, carbonate and oxide anions; and h is a number of Z required to fulfill the valence requirement of M in the compound, which on decomposition converts into oxide form, in quantity sufficient to obtain a loading of MO$_d$ on the support in the range of about 0.3 wt. % to about 30 wt. %;

(2) subsequent drying of the wet mass by heating it in air or under vacuum first slowly at about 50° C. for about 6 h and then at about 120° C. for about 2 h, (3) subsequent decomposition of the dried mass by heating it in air, inert gas or under vacuum at a temperature in the range of about 400° C. to about 600° C. for a period in the range of about 0.5 h to about 5 h;

(4) and calcining it at a temperature in the range of about 750° C. to about 1200° C. in air, inert gas or under vacuum for a period in the range of about 0.1 to about 10 h, to obtain the support precoated with MO$_d$, and (5) depositing A$_a$Co$_b$NiO$_c$ on the surface of the precoated support by impregnating or coating it with the compounds of nickel, cobalt and noble metals, represented by the formulae: NiY$_g$, CoY$_f$ and AX$_e$ respectively, wherein: Ni is nickel; Co is cobalt, A is a noble metal element selected from the group consisting of Ru, Rh, Pd, Pt, Ir, Os, or their mixture; Y is an anion selected from the group consisting of nitrate, acetate, formate, oxalate, oxide, carbonate and hydroxide anions; X is an anion selected from the group consisting of nitrate, acetate, chloride and (H$_2$Cl$_6$)$^{-4}$ anions; g and f are numbers of Y needed to fulfill the valence requirement of Ni and Co, respectively, in their compounds; and e is a number of X needed to fulfill the valence requirement of A in its compound, which on decomposition convert into their oxide form, with A/Ni and Co/Ni mole ratios in the range of 0 to about 0.1 and about 0.01 to about 2.0, respectively, and in quantities sufficient to obtain a loading of A$_a$Co$_b$NiO$_c$ on the precoated support in the range of about 0.3 wt. % to about 30 wt. %, (6) subsequent drying of the wet catalyst mass by heating it in air or under vacuum first slowly at about 50° C. for about 6 h and further at about 120° C. for about 2 h, and (7) subsequent decomposition of the dried catalyst mass by heating in air, inert gas or under vacuum at a temperature in the range of about 400° C. to about 600° C. for a period in the range of about 0.5 h to about 5 h and (8) finally calcining it in air, inert gas or under vacuum at a temperature in the range of about 750° C. to about 1200° C. for a period in the range of about 0.1 to about 10 h.

2. A process as claimed in claim 1, wherein the support used in the catalyst preparation is in the form of granules, spheres, cylindrical pellets, rings, saddles, or star and has pore volume and porosity in the range of about 0.05 cm$^3$g$^{-1}$ to about 0.5 cm$^3$g$^{-1}$ and about 10% to about 70%, respectively.

3. A process as claimed in claim 2, wherein the granules have the size ranging from about 1 mm to about 10 mm.

4. A process as claimed in claim 2, wherein the spheres, cylindrical pellets, rings, saddles or star have a the diameter or size in the range of about 3 mm to about 15 mm.

5. A process as claimed in claim 1, wherein the noble metal, A is Ru or Rh.

6. A process as claimed in claim 1, wherein the anion, X is chloride anion.

7. A process as claimed in claim 1, wherein the anion, Y is nitrate anion.

8. A process as claimed in claim 1, wherein the anion, Z is nitrate anion.

9. A process as claimed in claim 1, wherein the A/Ni mole ratio, a ranges from 0 to about 0.05, the Co/Ni mole ration, b ranges from about 0.05 to about 1.0 and wherein loading, X range from about 5 wt. % to about 20 wt. %, the loading, Y ranges from about 3 wt. % to about 15 wt. %.

10. A process as claimed in claim 1, wherein the element, M, is Mg.

* * * * *